(12) United States Patent
Snow et al.

(10) Patent No.: US 8,638,424 B2
(45) Date of Patent: Jan. 28, 2014

(54) CHARGE EQUALIZING CLOCK DRIVER AND OTHER ENHANCEMENTS FOR TIME-OF-FLIGHT DEPTH SENSING AND OTHER SYSTEMS

(75) Inventors: Dane Snow, Santa Clara, CA (US); Barry Thompson, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 13/008,647

(22) Filed: Jan. 18, 2011

(65) Prior Publication Data

US 2011/0205522 A1 Aug. 25, 2011

Related U.S. Application Data

(60) Provisional application No. 61/336,311, filed on Jan. 19, 2010.

(51) Int. Cl.
*G01C 3/08* (2006.01)
(52) U.S. Cl.
USPC ............... 356/5.01; 356/4.01; 356/5.1
(58) Field of Classification Search
USPC ......... 356/3.01–3.15, 4.01–4.1, 5.01–5.15, 356/6–22, 28, 28.5
See application file for complete search history.

(56) References Cited

U.S. PATENT DOCUMENTS

2003/0223053 A1* 12/2003 Liu et al. .................. 356/5.1
2009/0058705 A1* 3/2009 Cetin et al. ................ 341/155

* cited by examiner

*Primary Examiner* — Luke Ratcliffe
(74) *Attorney, Agent, or Firm* — Vierra Magen Marcus LLP

(57) ABSTRACT

A clock driver outputs first and second preferably complementary clock signals coupled to substantially equal capacitive loads. Before each clock state change, the clock driver briefly shorts-together the first and second clock signals, to equalize change on capacitive loads, which each assume a potential midway between high and low power supply levels. Charge from the logic high clock signal can thus be used to raise logic low level clock line, and vice versa, rather than draw power supply current. Substantial energy savings on the order of $C \cdot V^2 \cdot f$ is achieved, where C is effective capacitive load, V is power supply magnitude, and f is clock frequency. The clock driver includes first and second enhanced inverters (inverters that cannot enter short-circuit current mode) whose outputs are the first and second clock signals, and a transistor switch coupled between the inverter outputs. Turning on the transistor switch forces charge equalization.

20 Claims, 6 Drawing Sheets

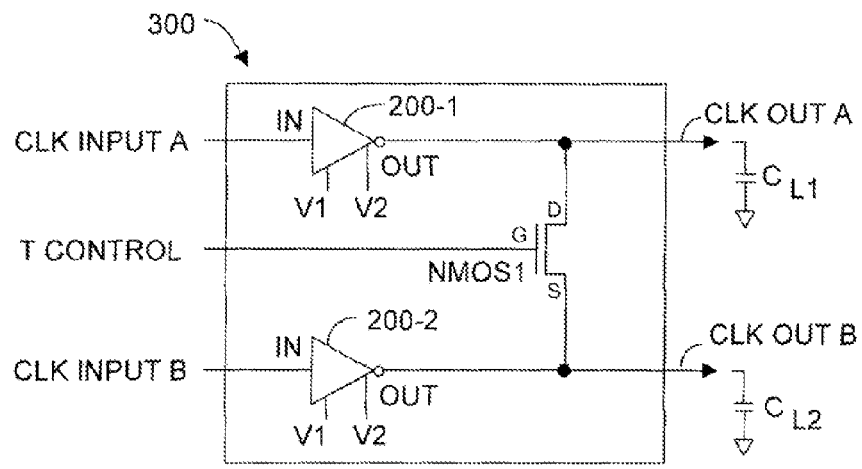
FIG. 5A
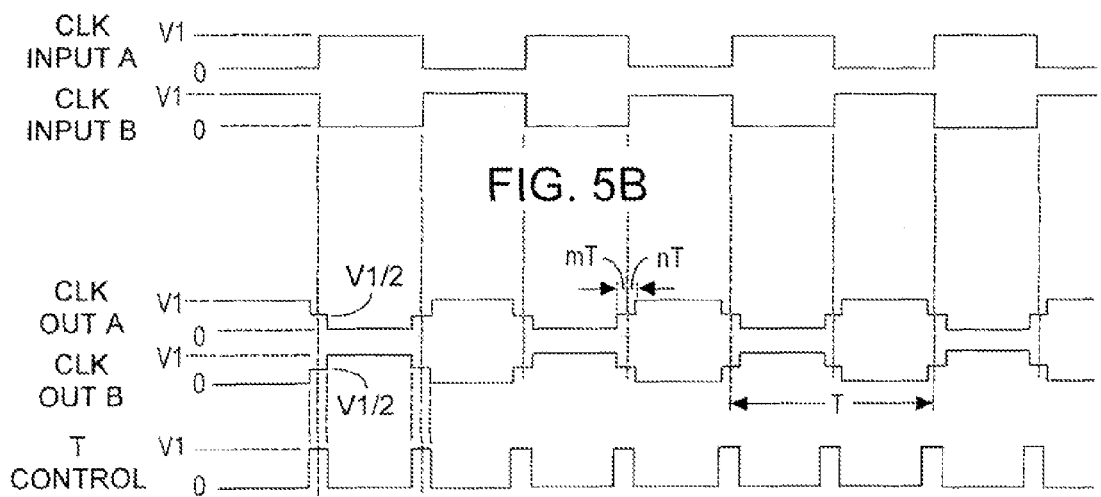
FIG. 5B
FIG. 5C
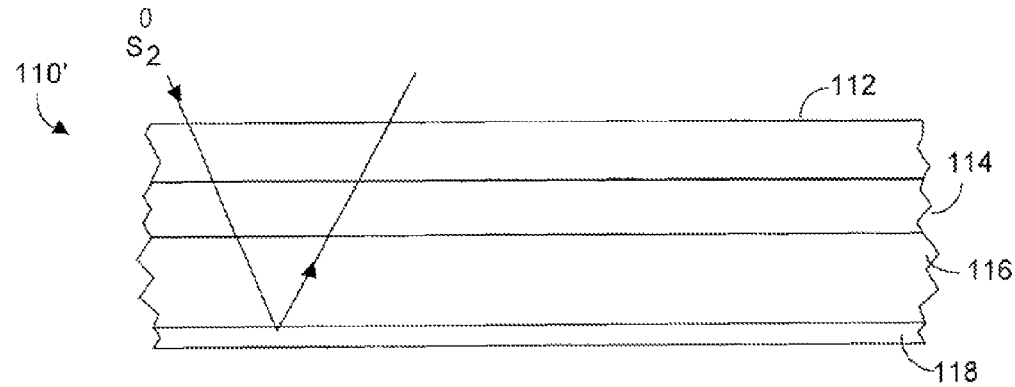
FIG. 6

CHARGE EQUALIZING CLOCK DRIVER AND OTHER ENHANCEMENTS FOR TIME-OF-FLIGHT DEPTH SENSING AND OTHER SYSTEMS

RELATION TO CO-PENDING APPLICATION

Priority is claimed from U.S. provisional patent application Ser. No. 61/336,311, filed 19 Jan. 2010 and entitled "Low Power Consumption Clock Circuitry, Semiconductor Backside Mirror, and High Power Frequency Laser Unit, and Advanced Filtering Concepts, Useful for Diverse Applications Including Time-of-Flight Depth Sensing".

FIELD OF THE INVENTION

The invention provide a charge equalizing clock driver with reduced power consumption, suitable for driving an array of image sensors in time-of-flight (TOF) imaging sensing systems, among other applications. The invention also provides for optional use of semiconductor backside mirrors, high frequency laser units, and advanced filtering concepts, useful for diverse applications including (TOF) depth sensing.

BACKGROUND OF THE INVENTION

Three-dimensional time-of-flight (TOF) systems that provide a measure of distance (Z) from the system to a target object without depending upon luminosity or brightness information obtained from the target object are known in the art. Many exemplary type TOF systems are described in numerous U.S. patents obtained by Canesta, Inc., which patents are now assigned to Microsoft, Inc. For example U.S. Pat. No. 6,323,942 entitled CMOS-Compatible Three-Dimensional Image Sensor IC (2001) describes TOF systems that emit optical energy and determine how long it takes until at least some of that energy reflected by a target object arrives back at the system to be detected. Emitted optical energy traversing to more distant surface regions of a target object before being reflected back toward the system will define a greater TOF than if the target object were closer to the system. If the roundtrip TOF time is denoted t1, then the distance between target object and the TOF system is Z1, where Z1=t1·C/2, where C is velocity of light. Such systems can acquire both luminosity data (signal amplitude) and TOF distance, and can realize three-dimensional images of a target object in real time.

A more sophisticated TOF system is exemplified by U.S. Pat. Nos. 6,515,740 (2003) and 6,580,496 (2003) respectively Methods and Systems for CMOS-Compatible Three-Dimensional Imaging Sensing Using Quantum Efficiency Modulation, obtained by Canesta, Inc. FIG. 1A depicts an exemplary phase-shift detection system 100 according to the '740 or the '496 patents. System 100 determines TOF by examining relative phase shift between transmitted light signals and signals reflected from the target object. Detection of the reflected light signals over multiple locations in the system pixel array results in measurement signals that are referred to as depth images.

Referring to FIG. 1A, TOF system 100 includes a two-dimensional array 130 of optical detectors 140, each of which preferably has dedicated circuitry 150 for processing detection charge output by the associated detector. By way of example, array 130 might include 100×100 pixels 140, and thus include 100×100 processing circuits 150. IC 110 also includes a microprocessor or microcontroller unit 160, memory 170 (which preferably includes random access memory or RAM and read-only memory or ROM), a high speed distributable clock and timing system 180, and various computing and input/output (I/O) circuitry 190. Clock system 180 preferably provides two preferably complementary clock signals per pixel detector. Quantum efficiency modulation performs a mixing function that demodulates phase (i.e., delay) information in the detected incoming optical energy. Among other functions, controller unit 160 may perform distance to object and object velocity calculations.

Under control of microprocessor 160, appropriately controlled drive waveforms are output by a low power generator 115, (e.g., perhaps 50 mW peak), which waveforms control a source of optical energy 120. Optical energy source 120 is thus preferably periodically energized and emits optical energy via lens 125 toward an object target 20 a distance Z away. The optical energy emitted by source 120 will have emissions of known frequency (perhaps 50 MHz to a few hundred MHz) for a time period known as the shutter time (perhaps 10 ms). Typically the optical energy is light emitted perhaps by a laser diode or LED device 120, and is denoted in FIG. 1A as $S_1=\cos(\omega \cdot t)$ although the emitted waveform need not be a perfect cosine. Some of the $S_1$ emitted optical energy will be reflected off the surface of target object 20 back toward TOF system 100, and is denoted as $S_2=A \cdot \cos(\omega \cdot t+\phi)$, where A is an amplitude coefficient and $\phi$ is phase shift. This reflected optical energy $S_2$ passes through an aperture field stop and lens, collectively 125, and falls upon two-dimensional array 130 of pixel (optical energy) detectors 140 where an image is formed.

Note that $S_1$ optical energy from emitter 120 and detected $S_2$ active optical energy signals within pixel detectors 140 are synchronous to each other such that phase difference $\phi$ and thus depth distance Z can be measured for each pixel detector. FIG. 1B depicts an exemplary idealized emitted $S_1$ signal, whereas the phase-delayed signal of FIG. 1B is an exemplary idealized return signal $S_2$ that will be detected by TOF system 100 and processed to yield information, include distance Z to target object 20.

In some implementations, each imaging pixel detector 140 captures time-of-flight (TOF) required for optical energy transmitted by emitter 120 to reach target object 20 and be reflected back for detection by two-dimensional sensor array 130. The optical detectors in array 130 can operate synchronously relative to active optical energy from emitter unit 120. If desired, such synchronous detection operation may be implemented with an electronic high speed shutter mechanism perhaps associated with lens 125. Using this TOF information, distances Z can be determined. Advantageously system 100 can be implemented on a single IC 110, without moving parts and with relatively few off-chip components. Note that while only active optical energy is emitted from unit 120, incoming optical energy may include both ambient optical energy components, sunlight perhaps, as well as the desired target object reflected-back active optical energy components.

As described in the '740 and '496 patents, optical energy detected by array 130 will include amplitude or intensity information, denoted as "A", as well as phase shift information, denoted as $\phi$. As shown by FIGS. 1B and 1C, the phase shift information varies with distance Z and can be processed to yield Z depth data. For each pulse or burst of optical energy transmitted by emitter 120, a three-dimensional image of the visible portion of target object 20 is acquired, from which intensity and Z data is obtained, denoted DATA. TOF systems according to the '740 and '496 patents obtain depth information Z by acquiring at least two samples of the target object (or scene) 20 with 90° phase shift between emitted optical energy and the pixel detected signals. While two samples is a minimum figures, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data.

Understandably, the accuracy of Z distance measurements can be affected by the accuracy of the clock timing signals coupled to exciter 115, and to the control of phase and/or shape of the signals output by emitter 120. Accurate Z measurements require that the phase of the signal output by emitter 120 be both stable and known relative to the phase (or any of the multiple phases) associated with time measuring unit 180 of system 100, otherwise, time measurement accuracy is degraded.

U.S. Pat. No. 7,636,150 issued to Canesta, Inc., entitled "Method and System to Enhance Timing Accuracy for Time-of-Flight Systems" describes many of the challenges associated with implementing timing systems in TOF systems. Other exemplary TOF systems are described in U.S. Pat. Nos. 6,323,942, 6,515,740, and 7,405,812, which patents were issued to Canesta, Inc. and are now assigned to Microsoft, Inc. Applicants refer to and incorporate by reference all of the patents cited herein for background reference purposes.

In many applications it is desired to operate TOF systems using battery power, yet TOF clock driver circuitry can often consume substantial operating power. For example, TOF systems exemplified by the '740 and '496 patents employ an array of CMOS image sensor elements that are driven by two preferably complementary clocks, which preferably form part of clock unit 180 in FIG. 1. A clock driver outputs the two clock signals, which alternately steer detection photocurrent to different pixel outputs and enable measurement of the received image phase or delay. Each pixel in the array presents a load to the clock driver output, and as a result the total cumulative capacitive load on the clock driver can be quite large. A high clock rate is preferred to increase phase differences produced by distances to the target object. However the combination of large capacitive clock load and high clock switching rate leads to high power dissipation due to $C \cdot V^2 \cdot f$ losses, where C is effective capacitive load, V is operating potential, and f is clock frequency. If the two clock signals were allowed to have arbitrary phase relationships, the power dissipation would effectively double, and become $2 \cdot C \cdot V^2 \cdot f$.

Clock circuits including TOF clock circuits frequently are implemented using CMOS buffers and inverters. It is useful to briefly review prior art CMOS inverters with reference to FIGS. 2A-2C. FIG. 2A shows a conventional CMOS inverter comprising a series-connected PMOS-NMOS transistor pair coupled between two power supplies, denoted V1, V2, where V1>V2, and commonly V2 may be ground. Typically the input gate notes (G) are coupled together, as are the output drain nodes (D). The source nodes (S) are coupled to the respective power supplies.

Referring to FIGS. 2A and 2B, when the input voltage signal (drawn with solid line) is low, ideally 0 VDC, the PMOS transistor will be biased ON, and the NMOS transistor will be biased OFF. The result is that the output voltage signal (drawn in phantom line for ease of illustration) will be high, i.e., the inverted state from the low input signal. Conversely when the input voltage signal is high, ideally V1, the PMOS transistor is biased OFF, and the NMOS transistor is biased ON. The result now is that the output voltage signal will be low, i.e., the inverted state from the high input signal.

But in practice, during state transitions from low-to-high or high-to-low, both the PMOS and NMOS transistors may be simultaneously ON while the input signal transitions through a voltage regime intermediate logic "low" and logic "high" levels. During this interval, noted in FIG. 2B at $t_{SC}$, the PMOS and NMOS transistors essentially define a short circuit (but for drain-source impedances) between the two power supplies. Thus, during this interval, denoted $t_{SC}$, a relatively high short circuit current $i_{SC}$ is drawn from the V1 power supply, and passes through the transistors to the V2 power supply. Referring to FIG. 2C, assuming the CMOS inverter has symmetrical rise and fall transitions, the current spike during $i_{SC}$ may be depicted as having a triangular shape. Under these assumptions, the energy (E) consumed per switching period may be calculated as:

$$E(\text{energy}) = 0.5 \cdot (V1-V2) \cdot i_{PEAK} \cdot t_{SC}$$

Understandably it is desired to minimize E, which goal can be achieved for a given power supply regime, i.e., V1, V2, by minimizing $i_{PEAK}$ and/or $t_{SC}$. During time $t_{SC}$ some energy is wasted in each switching transient because useful electrical current flows from power supply V1 to V2, rather than flowing into the load connected to the CMOS inverter output. Clock drivers typically utilize inverter stages. Thus, an enhanced inverter design can contribute to clock drivers that dissipate less energy, and thus operate more efficiently.

What is needed is a clock driver architecture, suitable for use in clocking detector arrays in a TOF system. Such improved clock drivers should minimize power consumption, preferably by substantially reducing so-called short-circuit current in inverters used to implement the clock driver. Further, such clock driver architecture should preferably provide a mechanism to equalize charge present on the capacitive load seen by the clock driver output signals, to substantially further reduce power dissipation.

In other aspects, TOF system efficiency can also be enhanced by better utilizing incoming $S_2$ optical energy. In some applications, TOF system performance requires higher power optical energy source(s). Finally, TOF system performance can be enhanced using advanced filtering concepts.

Embodiments of the present invention provide such an enhanced clock driver, and other enhancements for TOF systems and other systems.

SUMMARY OF THE PRESENT INVENTION

In one embodiment, an improved clock driver architecture for driving an array of pixel detectors such as found in a TOF system is provided, as is a method for driving such arrays with clock signals. The clock driver preferably outputs first and second complementary clock signals that alternately steer detection photocurrent to different CMOS pixel detectors, whose detection outputs enable measurement of the received image phase or delay. As such, the first and second clock signals see substantial capacitive loading, respectively $C_{L1}$ and $C_{L2}$, and, but for the present invention, substantial losses in operating power may exist.

Preferably the clock driver is implemented using first and second enhanced inverters whose output transistors cannot be turned ON simultaneously. A first clock input signal is coupled to input of the first enhanced inverter, and a second clock input signal is coupled to input of the second enhanced inverter. The enhanced inverter architecture enables the preferably complementary first and second output clock signals, provided respectively by output from the first and second enhanced inverters, to be shorted together briefly. The clock drive further includes a transistor switch, coupled between the first output clock signal (output of the first inverter) and the second output clock signal (output of the second inverter). Preferably such shorting-together commences shortly before and lasts until shortly after completion of the clock transition states.

This shorting-together forces equalization of charge on the effective capacitive loads $C_{L1}$ and $C_{L2}$, which each assume a potential midway between high and low power supply levels. This charge equalization is completed before onset of transition state change, e.g., from high-to-low, or low-to-high. Charge from the logic high clock signal can thus be used to raise logic low level clock line, as contrasted with using current from the upper power supply to raise the logic low level clock, and vice versa for opposite state transitions. The power savings is substantial, being on the order of $C \cdot V^2 \cdot f$, where C is effective capacitive load, V is magnitude of the power supply, and f is clock frequency.

In one embodiment an enhanced inverter is implemented with a PMOS-NMOS transistor pair coupled between first and second sources of operating potential. The CMOS inverter further includes an input logic circuit cross-coupled between the CMOS inverter input and gates of the PMOS and the NMOS transistors to prevent simultaneous ON condition of both transistors. The input logic circuit includes a NOR gate whose first input is coupled to the CMOS inverter input and whose second input is coupled to the NMOS transistor gate. The NOR gate output is delayed and coupled to the PMOS transistor gate and to the second input of a NAND gate. The first input of the NAND gate is coupled to the PMOS transistor gate. The NAND gate output is delayed and coupled to the NMOS transistor gate, which is coupled to the second input of the NOR gate.

Other embodiments include a backside mirror, enhanced power laser source, and advanced filtering, all suitable for TOF systems.

Other features and advantages of the invention will appear from the following description in which the preferred embodiments have been set forth in detail, in conjunction with their accompanying drawings.

BRIEF DESCRIPTION OF THE DRAWINGS

FIG. 5A depicts an enhanced clock driver suitable for driving an image array, implemented with enhanced inverters as depicted in FIG. 4, and with dynamically adjustable power consumption, according to embodiments of the present invention;

FIG. 5B depicts complementary clock input signals to the enhanced clock driver of FIG. 5A, according to embodiments of the present invention;

FIG. 5C depicts a T control signal and first and second pedestal-modified complementary clock output signals from the enhanced clock driver of FIG. 5A, according to embodiments of the present invention;

FIG. 6 depicts use of a backside mirror to enhance detection, according to embodiments of the present invention;

DETAILED DESCRIPTION OF THE PREFERRED EMBODIMENTS

Figure 1A:
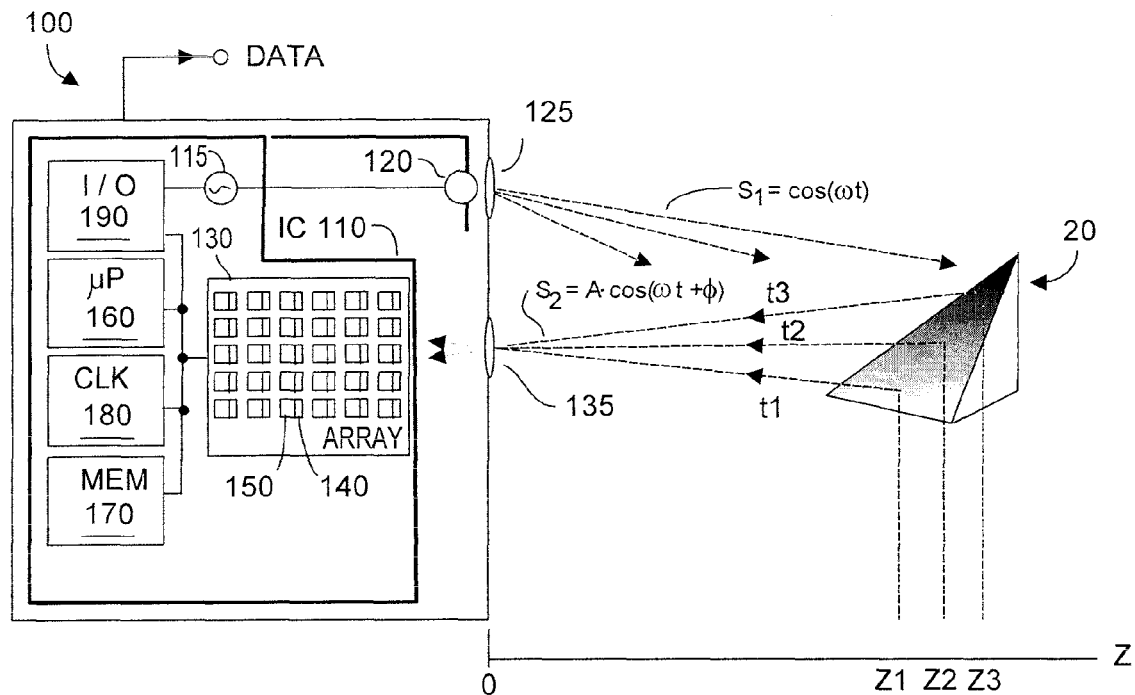
FIG. 1A is a block diagram depicting a phase-shift three-dimensional imaging system as exemplified by U.S. Pat. No. 6,515,740 and U.S. Pat. No. 6,580,496, according to the prior art.
Figure 1B:
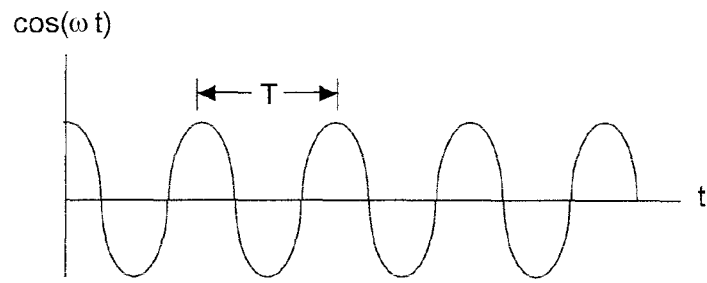
FIGS. 1B and 1C depict exemplary waveform relationships for the block diagram of FIG. 1A, according to the prior art.
Figure 1C:
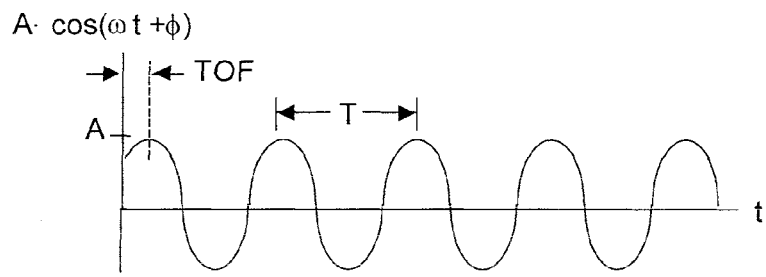
Figure 2A:
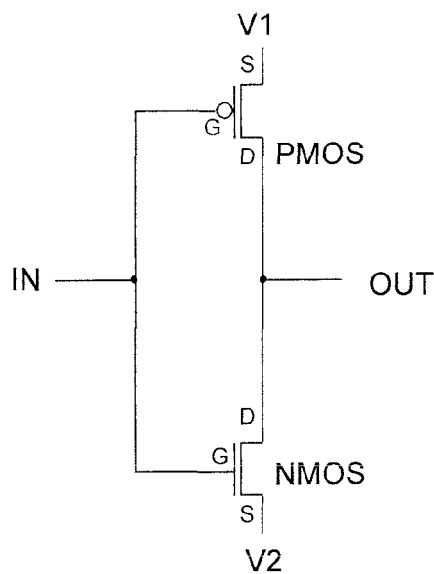
FIG. 2A is a schematic of a CMOS inverter, according to the prior art.
Figure 2B:
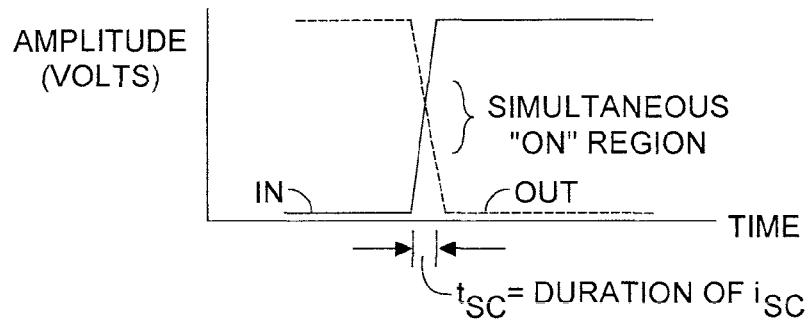
FIG. 2B depicts voltage-vs-time waveforms associated with the inverter of FIG. 2A, according to the prior art.
Figure 2C:
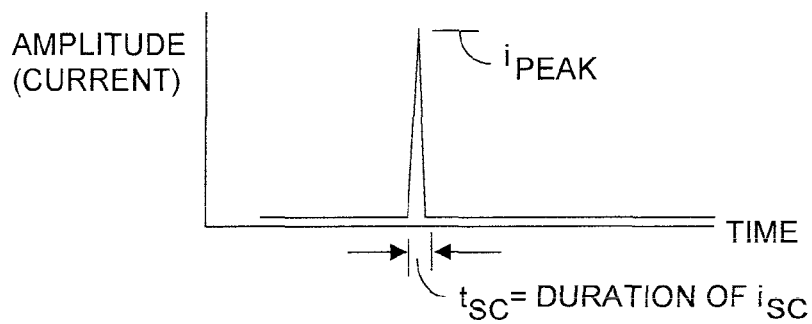
FIG. 2C depicts the peak current-vs-time waveform for the inverter of FIG. 2A, according to the prior art.
Figure 3:
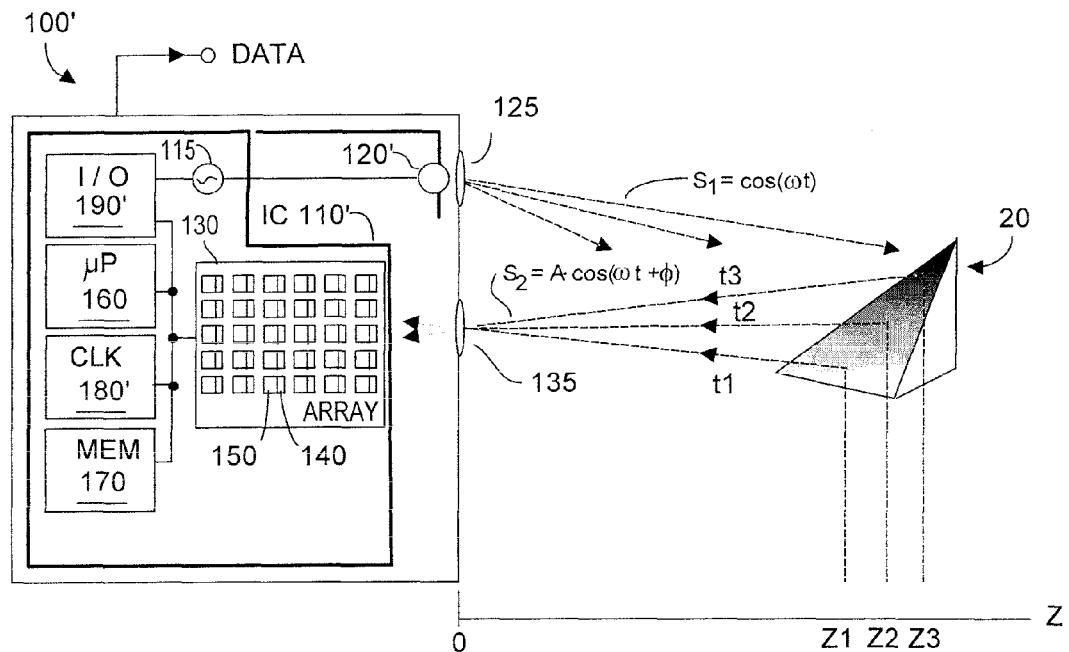
FIG. 3 depicts a TOF system provided with at least one enhancing feature, according to embodiments of the present invention.

FIG. 3 depicts a TOF depth system 100' that is similar to system 100 shown in FIG. 1A, but for components called out with different reference numerals, e.g., clock unit 180', input/output unit 190', optionally emitter(s) 120', and IC 110'. Thus operation of TOF system 100' is similar or identical to operation of system 100 shown in FIG. 1, but for the improvements described herein.

In one embodiment, an improved clock driver architecture for driving an array 130 of pixel detectors such as found in a TOF system 100' is provided, as is a method for driving such arrays. The clock driver may be implemented as part of clock unit 180' in TOF system 100' in FIG. 3, and outputs first and second preferably complementary clock signals whose duty cycle is preferably substantially 50%, i.e., square-wave, but may in fact have a duty cycle other than 50%. In a TOF image system application, the first and second clock signals alternately steer detection photocurrent to different CMOS pixel detectors within array 130. The detector outputs enable measurement (DATA) of the received image phase or delay. In practice, the pixel detectors contribute a fairly substantial capacitive load to the clock signals. In an array 130 of perhaps 500×500 detectors, the effective capacitive load presented to each clock signal can be on the order of a few pF, perhaps 2 pF to about 5 pF. At a clock rate of a few hundred MHz, perhaps 200 MHz, dissipated energy per clock transition state, e.g., low to high, or high to low, can be relatively large unless an enhanced clock driver is provided, according to embodiments of the present invention.

If the first and second clock signals were to have arbitrary phase relationships to one another, the energy loss per state transition would be substantial, $2 \cdot C \cdot V^2 \cdot f$, where C is $C_{L1}$ or $C_{L2}$, the effective capacitive load seen by clock output 1 or clock output 2, V is the power supply magnitude, and f is effective switching frequency. In practice, $C_{L1} \approx C_{L2}$ due to symmetry of the detector elements within array 130. As will now be described, an improved clock driver according to the present invention reduces the energy loss per state transition is reduced by about 50%, to $C \cdot V^2 \cdot f$.

Figure 4:
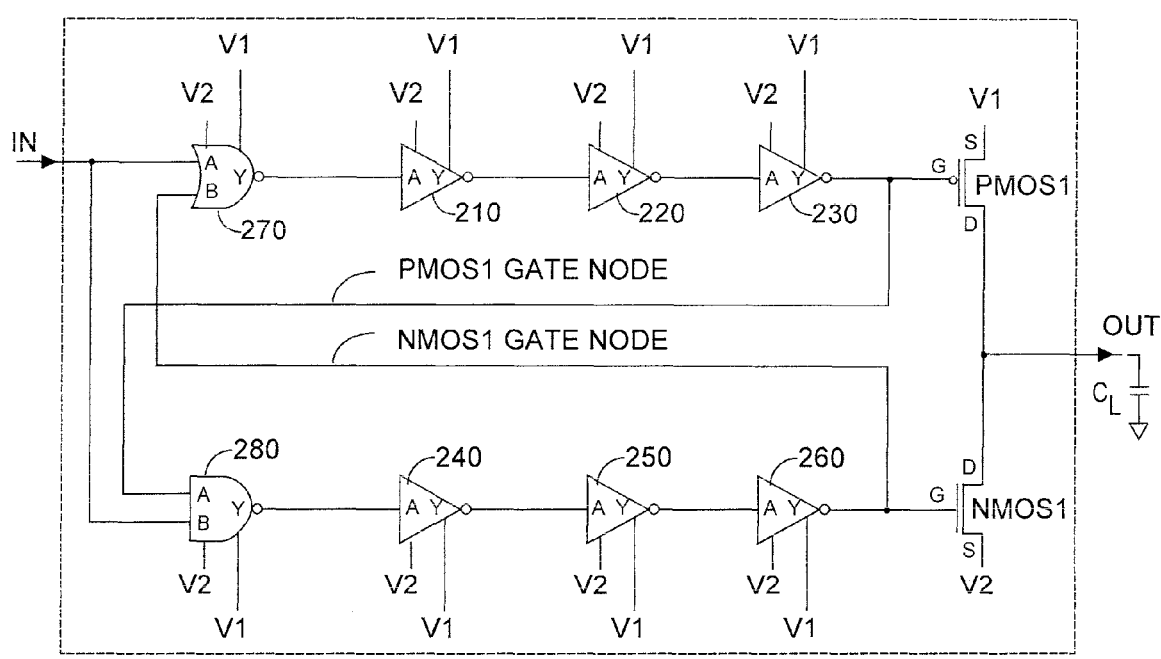
FIG. 4 depicts an enhanced inverter with non-overlapping drive signals such that short circuit current is substantially eliminated, according to embodiments of the present invention.

An improved clock driver according to an embodiment of the present invention is shown in FIGS. 5A-5C, but it is useful to first describe an improved CMOS inverter with which the improved clock driver is preferably implemented. Referring first to FIG. 4, an improved CMOS inverter 200 is shown, the inverter being improved in that its output transistors PMOS1 and NMOS1 can never be turned ON simultaneously, which is to say that short circuit current $i_{SC}$ conditions can never exist for the inverter. This aspect of improved CMOS inverter 200 is utilized in implementing the improved clock driver of FIGS. 5A-5C.

In FIG. 4, enhanced CMOS inverter unit 200 preferably includes a first delay element comprising inverters 210, 220, 230, and a second delay element comprising inverters 240, 250, 260. Preferably the ripple-through delay of the first delay element is substantially equal to the ripple-through delay of the second delay element. Enhanced CMOS inverter unit 200 further includes NOR gate 270 and NAND gate 280. Each inverter and NOR and NAND gate is shown coupled to power sources providing V1 and V2 operating potentials, where V1>V2 and potential V2 may be ground. (If V2=0 VDC, V1 may be understood to be V in the equations used herein to express energy loss.) The input(s) to the various inverters 210, 220, 230, 240, 250, 260 are denoted A and the inverter outputs are denoted Y. The inputs to NOR gate 270, and to NAND gate 280 are denoted A and B, and the output from the NOR and the NAND gate is denoted Y.

Input to enhanced inverter 200 is presented to one input of NOR gate 270 and to one input of NAND gate 280. The NOR gate output is delayed by the first delay element (inverters 210, 220, 230) and is coupled to the gate of PMOS1 and is also cross-coupled to a second input of the NAND gate. The NAND gate output is delayed by the second delay element (inverters 240, 250, 260) and coupled to the gate of PMOS1 and is also cross-coupled to the second input of NOR gate 270.

So implemented, it is ensured that non-overlapping drive signals will never be presented to the gates of PMOS1 and NMOS1. As a consequence, enhanced CMOS inverter 200 is never in a short circuit current condition because output transistors PMOS1 and NMOS1 can never be biased ON simultaneously.

By way of example, for an output low-to-high transition of enhanced inverter 200, the input transitions in the opposite direction, from high to low. In this case, just prior to transition, the IN signal to inverter 200 and the gates of both PMOS1 and NMOS1 will be high. After the input goes low, this state change ripples through NAND gate 280 and the second delay elements (inverters 240, 250, 260) before reaching the gate of output transistor NMOS1. The result is that transistor NMOS1 turns-off. But until this rippled-through signal reaches the gate of NMOS1, the NMOS1 gate remains in a high state, which forces the output of NOR gate 270 to be in a low state. This NOR gate 270 low output ripples through the first delay elements (inverters 210, 220, 230), which causes the gate of PMOS1 to be high, which keeps transistor PMOS1 turned off.

But after the NMOS1 gate transitions low, NOR gate 270 is activated and transitions high. This NOR gate 270 high output ripples through the first delay element (inverters 210, 220, 230) until the PMOS1 gate finally transitions low, which causes transistor PMOS1 to turn-on and to pull the inverter 200 output node high. Note that at no time were there overlapping signals to the gates of PMOS1 and NMOS1, which signals (if present) could have turned both output transistors on simultaneously, giving rise to $i_{SC}$ and to a large value of E during a time $t_{SC}$.

Those skilled in the art will appreciate that an inverter 200 output transition from high-to-low will operate similarly, and will not create overlapping gate drive signals to PMOS1 and NMOS1 that would give rise to $i_{SC}$ and to a large value of E. In the configuration of FIG. 4, the magnitude of ripple delay from inverter 200 input to output can be adjusted by adding or by removing inverters in the first and second delay elements. Referring to FIG. 3, improved inverters 200 may be used to implement circuits not only within clock unit 180', but without limitation, within input/output stage 190' as well.

As will now be described with reference to FIGS. 5A-5C, an enhanced clock driver according to the present invention preferably is implemented using improved inverters whose output transistors cannot be turned ON simultaneously. Such architecture enables the preferably complementary first and second output clock signals to be shorted together briefly before turning-ON inverter transistors. Preferably such shorting-together commences a fraction m, typically a few percent, of the period T of the clock signal, before clock state transition begins, and continues for a fraction n, typically a few percent, of the period T after transition clock state transition concludes. Such shorting-together of the clock signals equalizes the charge seen by $C_{L1}$, $C_{L2}$ during state transition times and equalizes the voltage at each clock output to approximately half the power supply level. This advantageously enables charge on the high state clock line to raise or pull-up charge on the low state clock line, rather than draw current from the power supply to pull-up charge on the low state clock line. In this fashion, energy loss per transition state is halved from $2 \cdot C \cdot V^2 \cdot f$ for an arbitrary phase relationship between first and second clocks, to $C \cdot V^2 \cdot f$, according to the described embodiment. Preferably adiabatic charging is used, which charging technique well known to those skilled in the relevant art.

Referring now to FIGS. 5A-5C, two enhanced CMOS inverters 200-1, 200-2, each functioning as described with reference to FIG. 4 to preclude simultaneous ON condition, are used with an output transistor NMOS1 to implement an enhanced clock driver 300, according to embodiments of the present invention. As shown in FIGS. 5B and 5C, clock driver 300 receives first and second input clock signals (CLOCK INPUT A, CLOCK INPUT B), and inverts these signals as first and second output clock signals (CLOCK OUTPUT A, CLOCK OUTPUT B); see FIG. 5C. Although complementary and square-wave first and second input signals are depicted in FIG. 5B, it is understood that in many applications, non-complementary signals including signals having other than 50% duty cycle may be used.

The first and second output clock signals are coupled to respective first and second capacitive loads $C_{L1}$, $C_{L2}$, which loads in a TOF application represent effective capacitance of pixel detectors coupled to the clock signals. However clock driver 300 further includes a T control input signal (see FIG. 5C) that can turn ON NMOS1 transistor so as to short-together the first and second output clock signals. One can safely short-together the outputs of enhanced inverters 200-1, 200-1 because of their non-short circuit capability.

Preferably T CONTROL turns-On NMOS1 shortly before mid-transition (i.e., low-to-high, or high-to-low) state of the first and second clock output signals. If the clock period is T, the turn-ON time occurs a fraction m of T, e.g., m·T before transition state, and lasts for a fraction n of T, e.g., n·T after transition state. Preferably m and n are a few percent of the period T, for example about 2% to about 6%. By way of example, if T is about 5 ns, then m·T and n·T are preferably each about 0.2 ns. The two fractions m and n may be equal in magnitude but need not be.

As shown in FIG. 5B, selectively turning ON NMOS1 with T CONTROL creates a pedestal in the first and second clock output signals. As noted this pedestal begins shortly before transition state change and persists until slightly after transition state change. If power supply potential V2 is assumed to be ground, then magnitude of the pedestal will be 0.5·V1, e.g., mid-way between power supply levels. As such, charge present on the high state clock line is available to pull-up charge on the low state clock line, rather than draw current from the power supply to elevate charge on the low state clock line. As noted, this aspect of the present invention essentially halves the energy loss E to $V^2 \cdot f$ for the preferred embodiment.

It will be appreciated that charge equalization according to the present invention may be practiced with more than two clock lines. For example, clock unit 180' in FIG. 3 may include clock driver(s) 300 that equalize charge between N high lines (i.e., high logic state signal lines) and M low lines (i.e., low logic state signal lines). Alternatively, clock unit 180' in FIG. 3 could be implemented using clock lines formed into groups of two, such as shown in FIG. 5A. Other implementations could also be used.

Additional, optional, embodiments to a TOF system such as shown in FIG. 3 will now be described, including use of a back-side mirror 110', high energy laser emitter 120', and advanced filtering for I/O circuitry 190'.

As described with respect to FIG. 1A, much of TOF system 100, and much of TOF system 100' may be fabricated on a CMOS semiconductor IC 110, or 110' (for FIG. 3). Referring now to FIG. 6, the advantage of providing a backside mirror 118 to the lower surface of the substrate upon which IC 110 is fabricated will be described. Note that in FIG. 3, the notation IC 110' denotes that TOF system 100' is modified compared to TOF system 100 in FIG. 1A, and may be provided with a backside mirror 118, according to embodiments of the present invention.

In FIG. 6, 112 denotes a passivation layer of thickness A, 114 denotes an epi layer of thickness B, 116 denotes the substrate of thickness C, and 118 denotes an additional backside metal mirror, according to embodiments of the present invention. Incoming optical energy S2 (see FIG. 3) impinges upon the upper surface of IC 110' and begins to travel downward into the depth of the structure. If S2 is say optical energy in the 850 nm range, absent backside mirror 118, useful photocharges (to be detected and processed to yield phase change and Z depth information) are generated in epi layer 114. In practice, perhaps 20% of the charges are generated in this epi layer. However the incoming optical energy also penetrates into the underlying substrate 116, where most of the photocharges that are generated will be lost, and of no use in determining depth or other information.

However by advantageously fabricated a mirror 118 on the backside of the substrate, S2 optical energy penetrating to the mirror can be at least partially reflected upward (as shown in FIG. 6) toward epi layer 114 for possible charge generation and collection. But for mirror 118, there would be no second chance to generate and collect charge from S2 optical energy entering into substrate 116. In practice, the effective quantum efficiency (QE) becomes $QE \cdot (1+(1-QE)^{1+2C/B})$.

Backside mirroring works best when quantum efficiency is low, perhaps about 1.5× improvement. Implementing a backside mirror structure 118 requires that the semiconductor die be thinned to about 20 μm, which is about half the thickness of conventionally produced dies. Understandably, care must be taken in handling the thinned die to avoid breakage during packaging. Preferably the semiconductor die is ground to about 40 μm thickness, followed by wet or dry etching to yield about 20 μm thickness. The wet/dry etch advantageously allows precise thinning to within a few microns. Preferably a wafer honeycomb etch structure is used to maintain a thicker die in non array area. In practice, only the area associated with array 130 need be etched to 20 μm, with other regions left thicker to provide structural strength, especially in bond pad areas.

Figure 7:
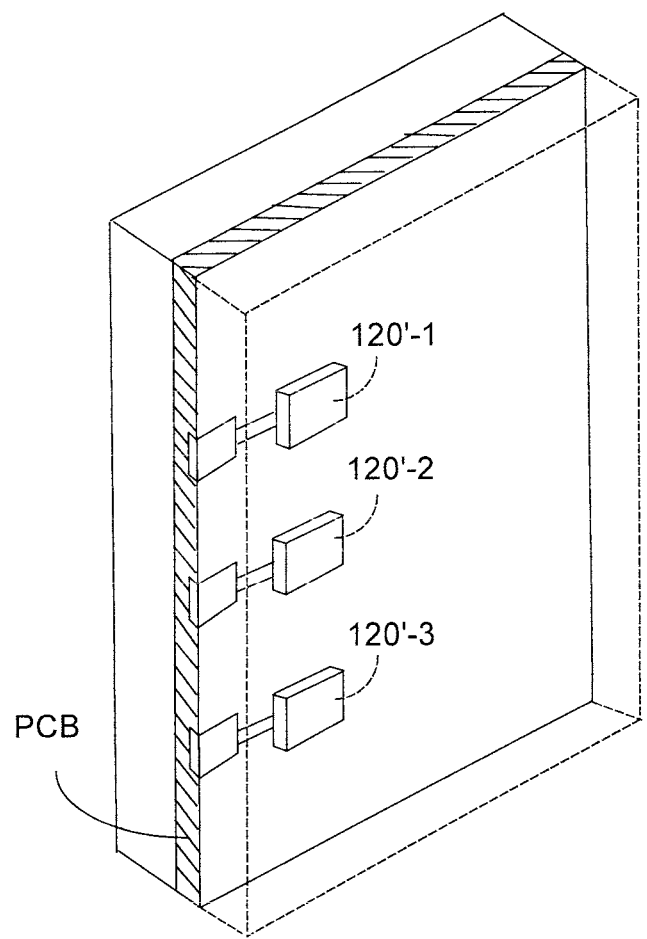
FIG. 7 depicts edge-mounted high energy optical sources such as may be used in a TOF system, according to embodiments of the present invention.

Referring now to FIG. 7, it may be desirable in TOF system 100' to provide substantially increased output optical energy by utilizing one or more high power, high frequency laser sources, denoted 120'-1, 120'-2, 120'-3. For example, creasing peak power of laser (or other source) 120 in FIG. 1 can enable a TOF system to better cope with higher ambient light, e.g., sunlight, for example by using shorter integration times. Shorter integration time is accompanied by shorter effective shutter time, and can reduce operating power. In addition, the magnitude of required power from source 120' is reduced because less ambient light is integrated. Analyses of optical power from source(s) 120 or 120' indicate that ambient light is on the order of 4× emitter optical energy power. Thus, enhancing emitted laser power by about 4× results in an acceptable operating regime in terms of ambient light. Higher peak emitted power requires more laser hardware, and size and cost become important design considerations. Further, use of higher operating frequency with high laser power sources is challenged in large extent by inductance associated with the laser package. Preferably high speed switching, monochromatic lasers are preferred, with little concern as to etendue.

As shown by FIG. 7, one or preferably inexpensive laser packages 120'-1, 120'-2, 120'-3, with many die and drivers, may be mounted directly on the edge of printed circuit board (PCB) or metal slug. As suggested by FIG. 7, a multi-stripe die may be used to create more peak optical power from 120'-1, 120'-2, etc. In practice, loss of etendue and optical accuracy may be relatively unimportant in many applications. In the configuration of FIG. 7, preferably very short bond wires or solder bumps, with less than 1 nH per bond wire, are used, with minimized driver related loss. Preferably a dedicated adjacent laser driver is provided for each die, as suggested by FIG. 7, where the structure shown may be used with TOF system 100' in FIG. 3. Thus in FIG. 7, elements 120'-1, 120'-2, 120'-3 may be understood to refer to the optical source driver, die, and optical source per se.

Advanced filtering concepts useful with embodiments of the present invention, and elsewhere, will now be described. Such filtering is implementable in FIG. 3 in hardware and/or software, for example as part of I/O unit 190'. In many depth processing applications, hardware may remain similar from production generation to product generation, with software used to fill any gaps. In some embodiments the presence of unlimited processing capability on a host device may be assumed, e.g., processor unit 160 with optional augmentation.

Figures 8A, 8B:
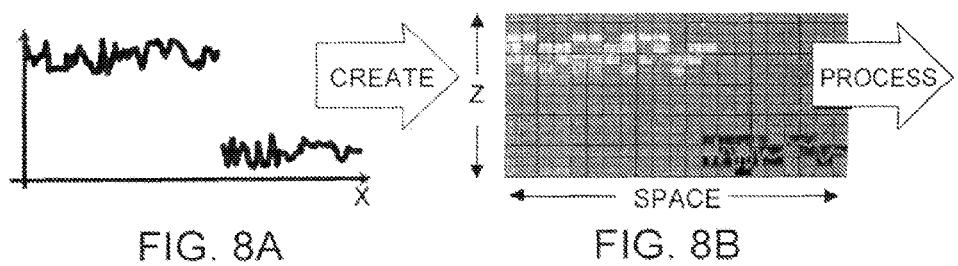
FIG. 8A depicts an input one-dimensional image, according to embodiments of the present invention.
FIG. 8B depicts a range-vs-space grid created from the one-dimensional image of FIG. 8A, according to embodiments of the present invention.
Figures 8C, 8D:
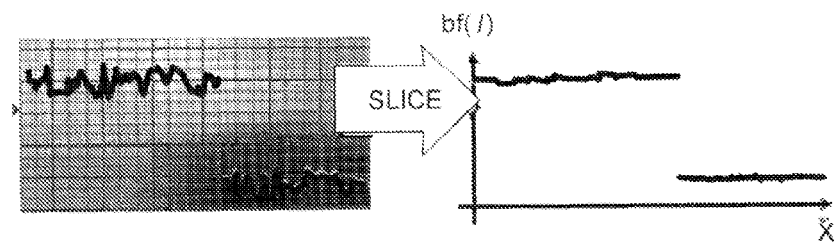
FIG. 8C depicts a filtered grid and slicing image obtained from the grid of FIG. 7B, according to embodiments of the present invention.
FIG. 8D depicts a filtered one-dimensional image, according to embodiments of the present invention.

Consider the use of a bilateral filter (BLF) with TOF system 100' in FIG. 3. Post-processing depth data can introduce limitations including higher noise at lower device gains, and less effective performance on smaller target objects. However preferred embodiments advantageously use spatial correlations. FIGS. 8A-8D depict a one-dimensional input signal and depict real-time edge-aware image processing with a bilateral grid. In FIG. 8A an one-dimensional image is represented and is used to create a range-vs-space grid as shown in FIG. 8B. In FIG. 8C a filtered grid and slicing image is created, and a slice is used to create the filtered one-dimensional image of FIG. 8D. Note that the one-dimensional image of FIG. 8D is a substantially clean version of the input one-dimensional image of FIG. 8A.

TOF system 100' and indeed non-TOF systems may include more advanced filtering concepts including without limitation an anisotropic diffusion filter, a filter type with proven gains in simulation. Such filters should be fast, with smart quantization. Design specifications can define hysteresis threshold(s), with a need to preserve spatial correlations. Preferably brightness image stability is exploited. So-called mesh smoothing may be employed. Relevant concepts lend themselves well to depth maps. For example, three-dimensional flow estimation can be used for trajectory filtering; Kalman filtering such as used in radar may be employed. Substantial performance gains can be realized for stationary objects.

Figure 9A:
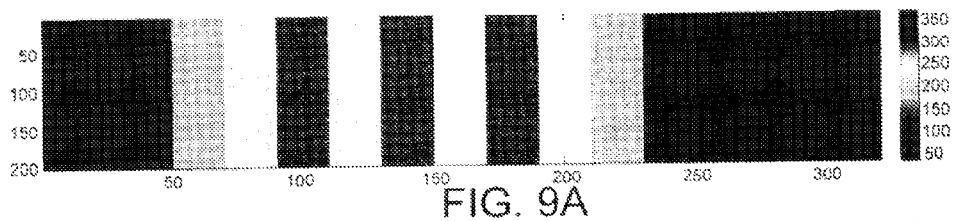
FIG. 9A depicts a noisy synthetic depth map, according to embodiments of the present invention.
Figure 9B:
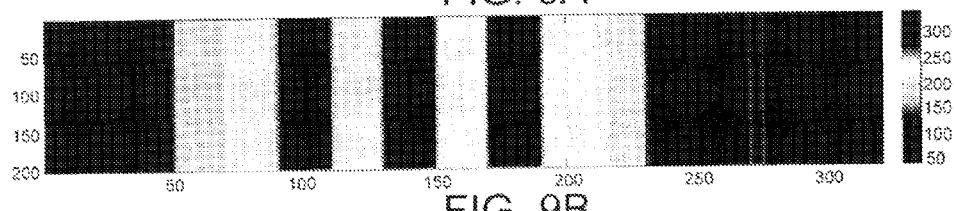
FIG. 9B represents an anisotropic diffusing filters depth map, according to embodiments of the present invention.
Figure 9C:
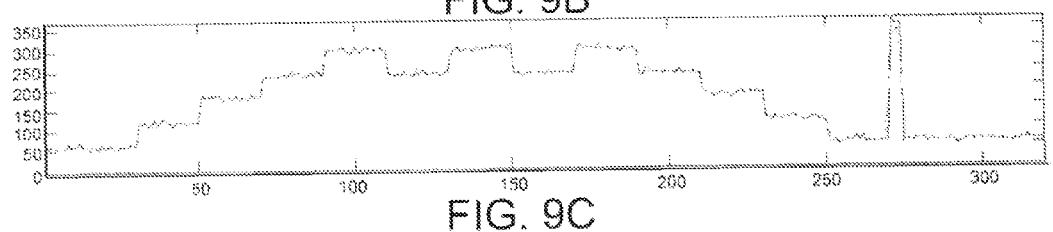
FIG. 9C depicts a one-dimensional comparison, according to embodiments of the present invention.

Anisotropic diffusion filters may be associated with iterative relaxation, with more predictable gains than bilateral filters, independent of noise, with an uncertainty reduction of 3× (on simulated on simulated depth maps), with parallelization that may be 20× faster on the graphics processing unit (GPU) for a 500×500 array image Consider now anisotropic diffusing filter uncertainty reduction 3× (low noise), where FIG. 9A is a noisy synthetic depth map, FIG. 9B is an anisotropic diffusing filter depth map, and FIG. 9C is a one-dimensional comparison. Data is for 30 simulated frames, Gaussian noise, and average of STD 19.8 to 5.9.

Graphics processing unit performance can be enhanced using anisotropic diffusing filter parallelization, according to embodiments of the present invention. In practice, 3× to 10× faster (NVIDI ANV30 vs. AMD Athlon 1900 MP and Intel P42 GHz). COLANTONI et al (2003). Fast and accurate color image processing using 3D graphics cards employing an nVIDIA TMNV30 graphic processor unit (GPU) is possible. The GPU can be 10× faster than the best CPU hitherto tested by applicants in the area of per-pixel processing, with mathematical complex functions and vectorial calculations. Speed improvement of 24× is attained for a similar filter on a 500×500 image (NVIDIA GeForce GTX280 GPU with 1 GB RAM vs. Intel Core 2 Duo 2.13 GHz CPU with 2 GB RAM) Allusse et al. (2008), GpuCV: AGPU-accelerated framework for image processing and computer Vi. Some of these data are summarized below in Table 1.

TABLE 1

| Image Size (pixels) | Cimg (ms) | CPU CV-CUDA (ms) | Improvement Factor |
|---|---|---|---|
| 2048 × 2048 | 1997 | 19.35 | 101 |
| 1024 × 1024 | 397 | 6.58 | 60 |
| 512 × 512 | 89.2 | 3.625 | 24 |
| 256 × 256 | 26.5 | 2.907 | 9 |
| 128 × 128 | 7.07 | 2.8 | 2.5 |

It will be appreciated that TOF system 100' in FIG. 3, or indeed non-TOF systems, may be implemented using one or more of the embodiments described herein, or indeed all of the embodiments. In general, however, it is preferred that complementary clock driver circuits for pixel arrays be implemented with clock driver circuits enabling mid-transition pedestals and charge equalization to reduce loss in energy E, as depicted in FIG. 5A-5C. Preferably such clock driver circuits, used to implement portions of clock unit 180' in FIG. 3, are implemented as described in FIGS. 4 and 5A.

Modifications and variations may be made to the disclosed embodiments without departing from the subject and spirit of the invention as defined by the following claims.

What is claimed is:

1. For use with a time-of-flight depth sensing system that includes an array of detectors driven by a first clock signal and a second clock signal, said first clock signal coupled to a capacitive load $C_{L1}$, and said second clock signal coupled to a capacitive load $C_{L2} \approx C_{L1}$, a method to reduce energy loss during clock transition changes in a clock driver that outputs said first clock signal and said second clock signal, the method including the following steps:

(a) prior to a transition state change of said first clock signal and prior to a transition state change of said second clock signal, equalizing charge present on said capacitive load $C_{L1}$ and said capacitive load $C_{L2}$;

(b) using charge present on a high state level one of said first clock signal and said second clock signal to elevate magnitude of charge present on a low state level one of said second clock signal and said first clock signal;

wherein using said charge present on the high state level one of said first clock signal and said second clock signal at step (b) reduces power consumption of said clock driver.

2. The method of claim 1, wherein step (a) includes shorting-together said first clock signal and said second clock signal.

3. The method of claim 1, wherein step (a) includes equalizing said charge present on said capacitive load $C_{L1}$ and said capacitive load $C_{L2}$ for a time duration of in a range of 2% to 6% of period of said first clock signal prior to said transition state change of said first clock signal.

4. The method of claim 1, wherein step (a) includes equalization said charge present on said capacitive load $C_{L1}$ and said capacitive load $C_{L2}$ for a time duration in a range of 2% to 6% of period of said first clock signal following said transition state change of said first clock signal.

5. The method of claim 1, wherein said first clock signal and said second clock signal are complementary.

6. The method of claim 1, wherein duty cycle of at least one of said first clock signal and said second clock signal is 50%.

7. The method of claim 1, wherein said first clock signal and said second clock signal each have 50% duty cycle and are complementary to one another.

8. The method of claim 1, wherein at least one of said first clock signal and said second clock signal has a pedestal mid-level in magnitude between a clock signal low logic state and high logic state.

9. The method of claim 1, wherein said clock driver includes:

a first enhanced inverter outputting said first clock signal;

a second enhanced inverter outputting said second clock signal; and a switch operatively coupled between said first clock signal and said second clock signal;

wherein each said first enhanced inverter and said second enhanced inverter function to preclude a short-circuit current mode of said inverter.

10. For use with a time-of-flight depth sensing system that includes an array of detectors driven by a first clock signal and a second clock signal, said first clock signal coupled to a capacitive load $C_{L1}$, and said second clock signal coupled to a capacitive load $C_{L2} \approx C_{L1}$, a clock driver outputting a first clock signal and a complementary second clock signal, the clock driver including:

a first enhanced inverter, including a first delay element precluding short-circuit current mode, outputting said first clock signal;

a second enhanced inverter, including for a second delay element precluding short-circuit current mode, outputting said second clock signal; and a transistor operatively coupled between said first clock signal and said second clock signal, the transistor controllably shorting-together said first clock signal and said second clock signal prior to a transition change of said first clock signal and prior to a transition change of said second clock signal;

wherein magnitude of charge present on CL1 and CL2 is equalized before each transition state of said first clock signal and said second clock signal;

wherein charge present on a high state level one of said first clock signal and said second clock signal is used to elevate magnitude of charge present on a low state level one of said second clock signal and said first clock signal.

11. The clock driver of claim 10, wherein said transistor equalizes said magnitude of charge present on CL1 and CL2 for a time duration of about 1.5% to 3% of duty cycle of said first clock signal prior to said clock transition state.

12. The clock driver of claim 10, wherein method of claim 1, wherein said first equalizes said charge for a time duration of 1.5% to 3% of duty cycle of said first clock signal following said clock transition state.

13. The clock driver of claim 10, wherein said transistor is an NMOS transistor.

14. The clock driver of claim 10, wherein said first clock signal and said second clock signal are complementary.

15. The clock driver of claim 10, wherein duty cycle of at least one of said first clock signal and said second clock signal is 50%.

16. The clock driver of claim 10, wherein said first clock signal and said second clock signal each have 50% duty cycle and are complementary to one another.

17. The clock driver of claim 10, wherein at least one of said first clock signal and said second clock signal has a pedestal mid-level in magnitude between a clock signal low logic state and high logic state.

18. The clock driver of claim 10, wherein said first enhanced inverter includes:

a first semiconductor switch and second semiconductor switch coupled in series between first and second sources of operating power;

a NOR gate having a first input, a second input, and an output;

a NAND gate having a first input, a second input, and an output, said first input of said NAND gate coupled to said first input of said NOR gate and defining an input node for said first enhanced inverter;

a first delay element coupled between said output of said NOR gate and an input node of said first semiconductor switch, said input node of said first semiconductor switch also coupled to said first input of said NAND gate;

a second delay element coupled between said output of said NAND gate and an input node of said second semiconductor switch, said input node of said second semiconductor switch also coupled to said second input of said NOR gate.

19. The clock driver of claim 18, wherein said first semiconductor switch is a PMOS transistor, and said second semiconductor switch in an NMOS transistor.

20. The clock driver of claim 10, wherein said clock driver operates with at least one parameter selected from a group consisting of (a) frequency of said clock driver is in a range from 100 MHz to 300 MHz, and (b) magnitude of $C_{L1}$ is in a range of 2 pF to 5 pF.

* * * * *